(12) United States Patent
Farag

(10) Patent No.: US 6,243,368 B1
(45) Date of Patent: Jun. 5, 2001

(54) DIGITAL CHANNEL SELECTION

(75) Inventor: Emad N. Farag, Kitchener (CA)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/999,362

(22) Filed: Dec. 29, 1997

(51) Int. Cl.$^7$ .......................... H04B 7/216; H04B 7/208
(52) U.S. Cl. .......................................... 370/330; 370/344
(58) Field of Search .................................... 370/319, 329, 370/330, 340, 343, 344

(56) References Cited

U.S. PATENT DOCUMENTS

| | | |
|---|---|---|
| 3,810,255 * | 5/1974 | Wachs et al. .................. 455/13.2 X |
| 5,247,515 * | 9/1993 | White ................................. 370/484 |
| 5,323,391 * | 6/1994 | Harrison ............................. 370/210 |
| 5,410,538 * | 4/1995 | Roche et al. ...................... 370/479 |
| 5,535,240 | 7/1996 | Carney et al. . |
| 5,537,435 | 7/1996 | Carney et al. . |
| 5,590,156 | 12/1996 | Carney . |
| 5,592,480 | 1/1997 | Carney et al. . |
| 5,602,847 * | 2/1997 | Pagano et al. .................... 370/484 |
| 5,815,525 * | 9/1998 | Smith et al. ....................... 375/200 |
| 6,023,459 * | 2/2000 | Clark et al. ........................ 370/329 |
| 6,047,175 * | 4/2000 | Trompower ........................ 455/222 |

* cited by examiner

*Primary Examiner*—Melvin Marcelo
*Assistant Examiner*—Phoungchau Ba Nguyen
(74) *Attorney, Agent, or Firm*—Gibbons, Del Deo, Dolan, Griffinger & Vecchione

(57) ABSTRACT

A method and apparatus are provided for selecting a digital channel from a composite digital signal which is made up of a plurality of digital channels. The method is accomplished by assigning two frequency bands of a plurality of frequency bands to each of the plurality of digital channels, wherein the two frequency bands overlap. A filtering process is accomplished by selecting a filter, from a group of filters, the selected filter corresponding to one of the frequency bands. The selected filter is then applied to the composite digital signal.

16 Claims, 8 Drawing Sheets

FIG. 10

| DISCRETE TIME | $-\frac{f_s}{8}$ | $-\frac{3f_s}{8}$ | $\frac{3f_s}{8}$ | $\frac{f_s}{8}$ |
|---|---|---|---|---|
| 0 | $I_i + jQ_i$ | $I_i + jQ_i$ | $I_i + jQ_i$ | $I_i + jQ_i$ |
| 1 | $\frac{I_i + Q_i}{\sqrt{2}} - j\frac{I_i - Q_i}{\sqrt{2}}$ | $-\frac{I_i - Q_i}{\sqrt{2}} - j\frac{I_i + Q_i}{\sqrt{2}}$ | $\frac{I_i - Q_i}{\sqrt{2}} + j\frac{I_i + Q_i}{\sqrt{2}}$ | $\frac{I_i - Q_i}{\sqrt{2}} + j\frac{I_i + Q_i}{\sqrt{2}}$ |
| 2 | $Q_i - jI_i$ | $-Q_i + jI_i$ | $-Q_i + jI_i$ | $-Q_i + jI_i$ |
| 3 | $-\frac{I_i - Q_i}{\sqrt{2}} - j\frac{I_i + Q_i}{\sqrt{2}}$ | $\frac{I_i + Q_i}{\sqrt{2}} + j\frac{I_i - Q_i}{\sqrt{2}}$ | $\frac{I_i - Q_i}{\sqrt{2}} + j\frac{I_i + Q_i}{\sqrt{2}}$ | $\frac{I_i + Q_i}{\sqrt{2}} + j\frac{I_i - Q_i}{\sqrt{2}}$ |
| 4 | $-I_i - jQ_i$ | $-I_i - jQ_i$ | $-I_i - jQ_i$ | $-I_i - jQ_i$ |
| 5 | $-\frac{I_i + Q_i}{\sqrt{2}} + j\frac{I_i - Q_i}{\sqrt{2}}$ | $\frac{I_i - Q_i}{\sqrt{2}} + j\frac{I_i + Q_i}{\sqrt{2}}$ | $\frac{I_i + Q_i}{\sqrt{2}} - j\frac{I_i - Q_i}{\sqrt{2}}$ | $-\frac{I_i - Q_i}{\sqrt{2}} - j\frac{I_i + Q_i}{\sqrt{2}}$ |
| 6 | $-Q_i + jI_i$ | $Q_i - jI_i$ | $-Q_i + jI_i$ | $Q_i - jI_i$ |
| 7 | $\frac{I_i - Q_i}{\sqrt{2}} + j\frac{I_i + Q_i}{\sqrt{2}}$ | $-\frac{I_i + Q_i}{\sqrt{2}} - j\frac{I_i - Q_i}{\sqrt{2}}$ | $-\frac{I_i - Q_i}{\sqrt{2}} - j\frac{I_i + Q_i}{\sqrt{2}}$ | $\frac{I_i + Q_i}{\sqrt{2}} - j\frac{I_i - Q_i}{\sqrt{2}}$ |

…

DIGITAL CHANNEL SELECTION

FIELD OF THE INVENTION

This invention relates generally to communications, and more particularly to digital communications.

BACKGROUND OF THE INVENTION

Wireless communication provides tetherless access to mobile users and addresses the requirements of two specific and disjoint domains: voice telephony and indoor data LANs. Cellular telephone networks have extended the domain of telephone service over a wireless last hop, while mobile-IP LANs such as WaveLAN and RangeLAN do the same for indoor users of TCP/IP data networks. Advances with wireless technology and high-speed integrated service wired networking promises to provide mobile users with comprehensive multimedia information access in the near future. For example, Personal Communication Services (PCS) are a broad range of individualized telecommunication services which enable individuals or devices to communicate irrespective of where they are at anytime. Personal Communication Networks (PCN) are a new type of wireless telephone system communicating via low-power antennas. PCNs offer a digital wireless alternative to the traditional wired line.

When transmitting a message signal over a communication channel, both analog and digital transmission methods can be used. Digital methods are preferred due to advantages over analog methods, including: increased immunity to channel noise and interference; flexible operation of the system; common format for the transmission of different kinds of message signals; improved security of communications through the use of digital encryption; and increased capacity.

Cellular and PCS technologies have evolved to utilize digital signals in order to provide higher capacity and improve communication quality. This signal is a composite digital signal which represents a block of adjacent channels. In selecting a channel, the use of multipliers are not desirable, as they are computationaly expensive. Efficient digital channel selection is desirable.

SUMMARY OF THE INVENTION

In accordance with the present invention, there is provided a method for selecting a digital channel from a composite digital signal comprised of a plurality of digital channels. The method comprises the steps of: assigning two frequency bands of a plurality of frequency bands to each of the plurality of digital channels, in which the two frequency bands overlap such that the digital channel is approximately centered in one of the two frequency bands and is near an edge of another of said two frequency bands; selecting a filter from a group of filters, the selected filter corresponding to the one of two frequency bands, wherein the digital channel is approximately centered; and applying the selected filter to the composite digital signal. An apparatus implementing the method is also described.

BRIEF DESCRIPTION OF THE DRAWINGS

A more complete understanding of the present invention may be obtained from consideration of the following description in conjunction with the drawings in which.

Figure 9:
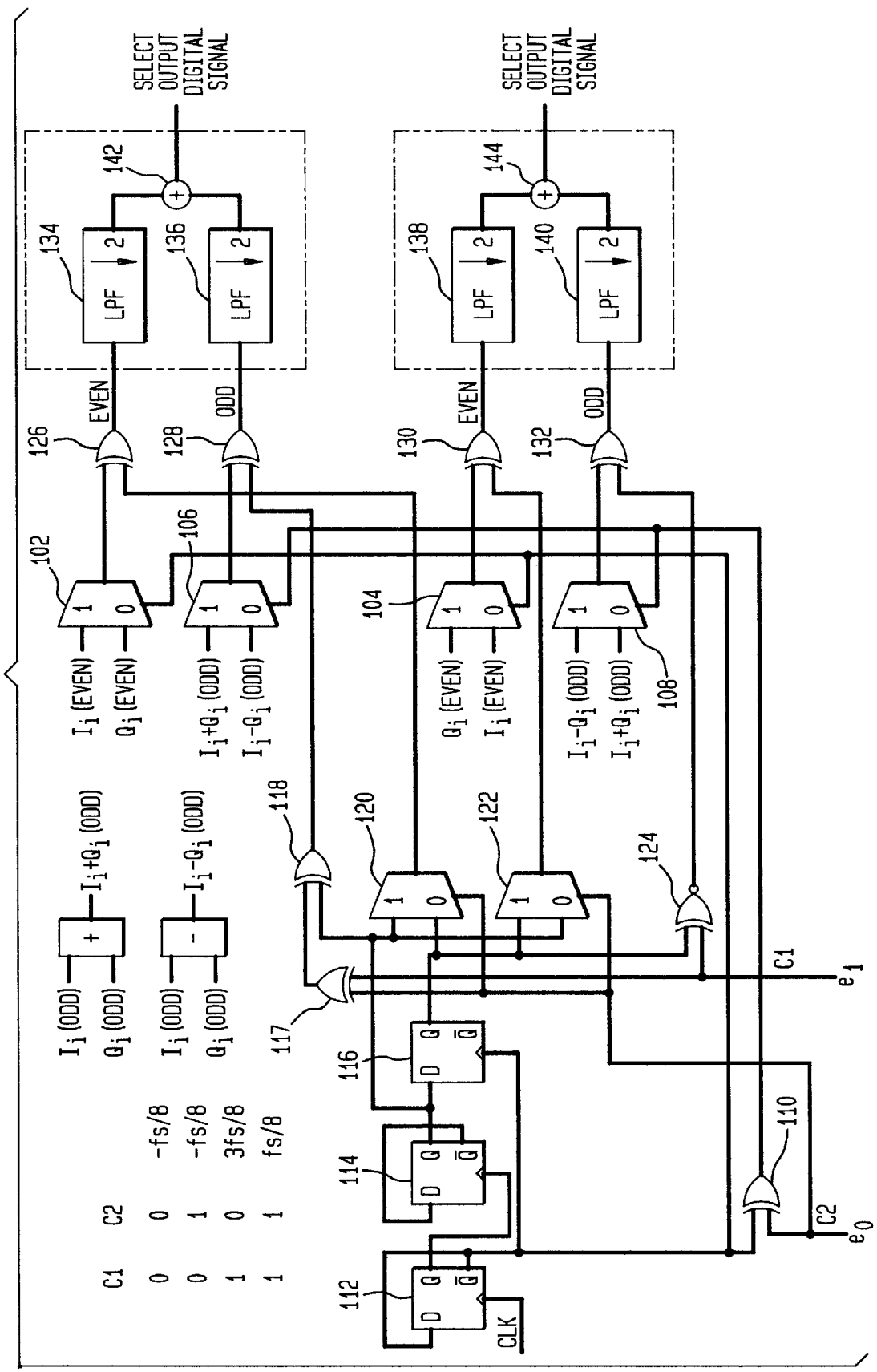

frequency shift followed by a low pass filter;

FIG. 9 shows a circuit diagram implementation of a $$a \pm \{1, 3\}\frac{f_s}{8}$$

frequency shifter followed by a low pass filter; and

FIG. 10 shows on frequency shift multiplier output.

DETAILED DESCRIPTION OF VARIOUS ILLUSTRATIVE EMBODIMENTS

Although the present invention is particularly well suited for use with wireless digital cellular systems, the methods and apparatus disclosed here in can be applied to other digital communication systems utilizing a composite digital signal.

Figure 1:
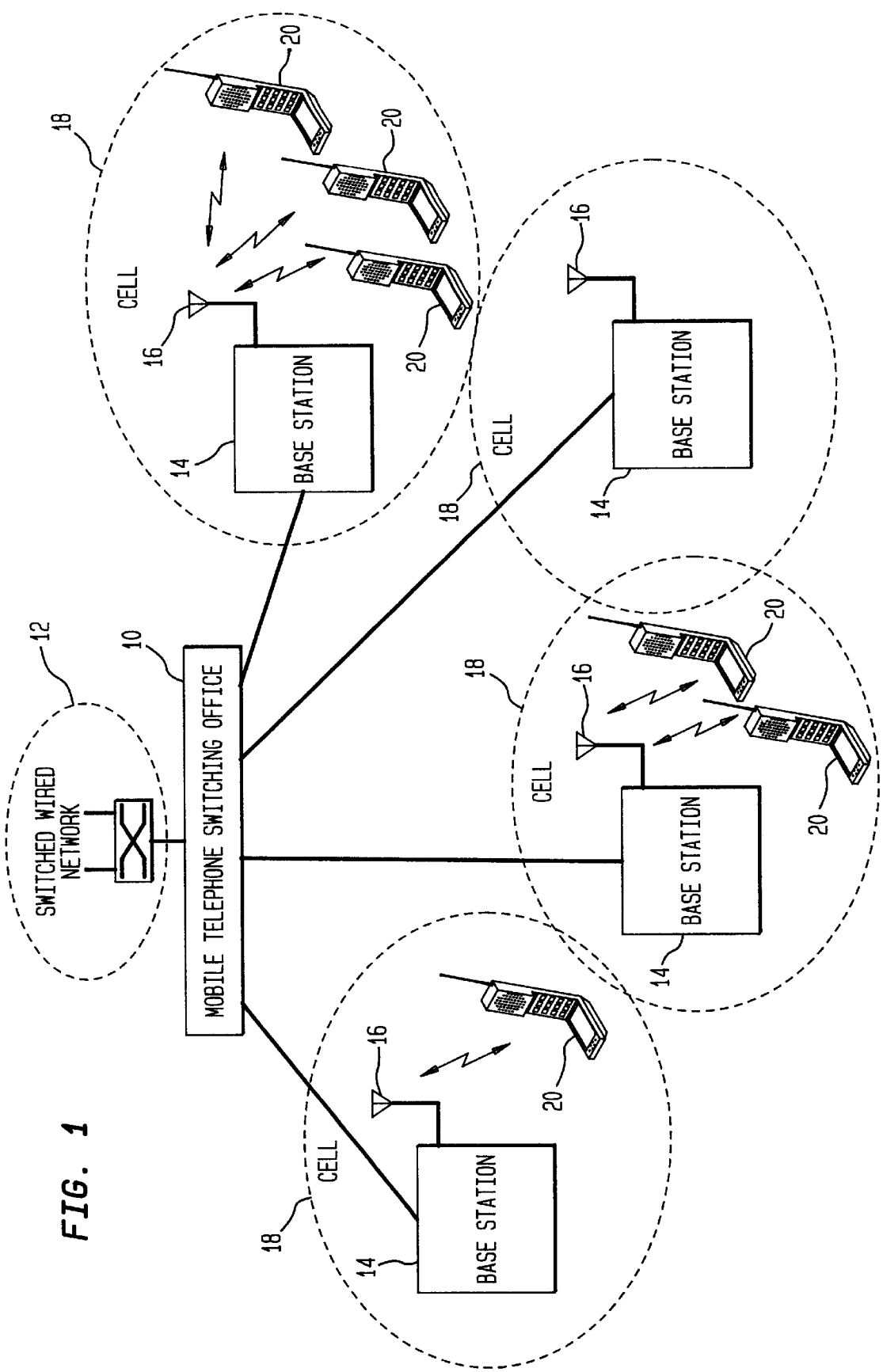
FIG. 1 is a block diagram of a wireless network employing the principles of the present invention.

Referring now to FIG. 1 there is shown a block diagram of a cellular wireless network. A Mobile Telephone Switching Office (MTSO) 10, also known as a Mobile Switching Center (MSC), provides for switching calls between the cellular network and the switched wired network 12. The MTSO 10 controls the entire operation of a cellular system, setting up and monitoring all cellular calls, and tracking the location of all cellular-equipped vehicles traveling in the system, arranging hand-offs, and providing billing information. The MTSO 10 is connected to a plurality of base stations 14 (public base stations). The cellular base station 14 is the fixed transceiver in the wireless network, which is coupled through a radio port to a cellular antenna 16. The geographical area for which a cellular base station 14 acts as the gateway is called its cell 18, the various cellular base station 14 nodes are distributed at suitable locations. A cellular mobile unit 20 communicates with a cellular base station 14 within a cell 18 through an assigned channel pair consisting of an uplink frequency and a downlink frequency.

Conventional Channel Selection Method

Figure 2:
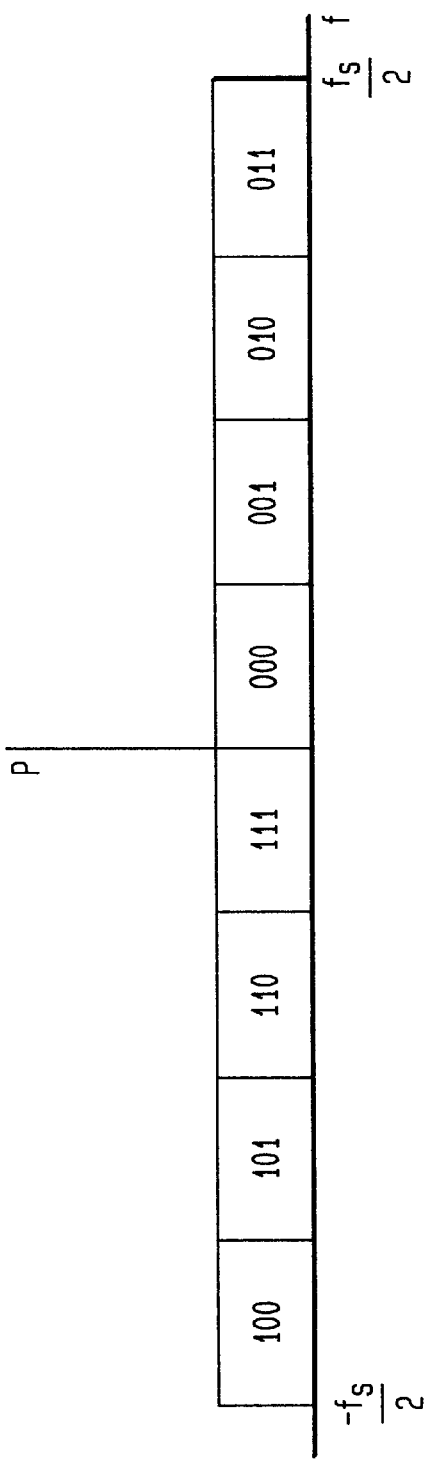
FIG. 2 is a diagram of the frequency spectrum of a complex baseband signal consisting of eight channels.

A digitized signal represents a block of adjacent channels, having a spectrum which for an 8 channel signal is represented in FIG. 2. This signal is called the composite digital signal, which is denoted by C. C is a complex discrete-time baseband signal, given by;

$$C(nT_s)=I(nT_s)+jQ(nT_s)$$

$T_s$ is the sampling time. C is composed of $M=2^m$ frequency division multiplexed channels, each denoted by $S_n$. Each of these channels occupies a frequency band df. The center frequency of the channel $S_n$ is given by:

$$f_n = (n+1/2)df$$

Where, n=−M/2, . . . , M/2−1. n can be expressed in a two's complement binary format. FIG. 2 shows the binary channel-numbering for the case where M=8.

To select channel $S_n$, the composite signal is multiplied by a sinusoidal signal of frequency $-f_n$. This shifts channel $S_n$ to be centered around the zero frequency. A low pass decimation filter selects channel $S_n$ and rejects the remaining channels.

Figure 3:
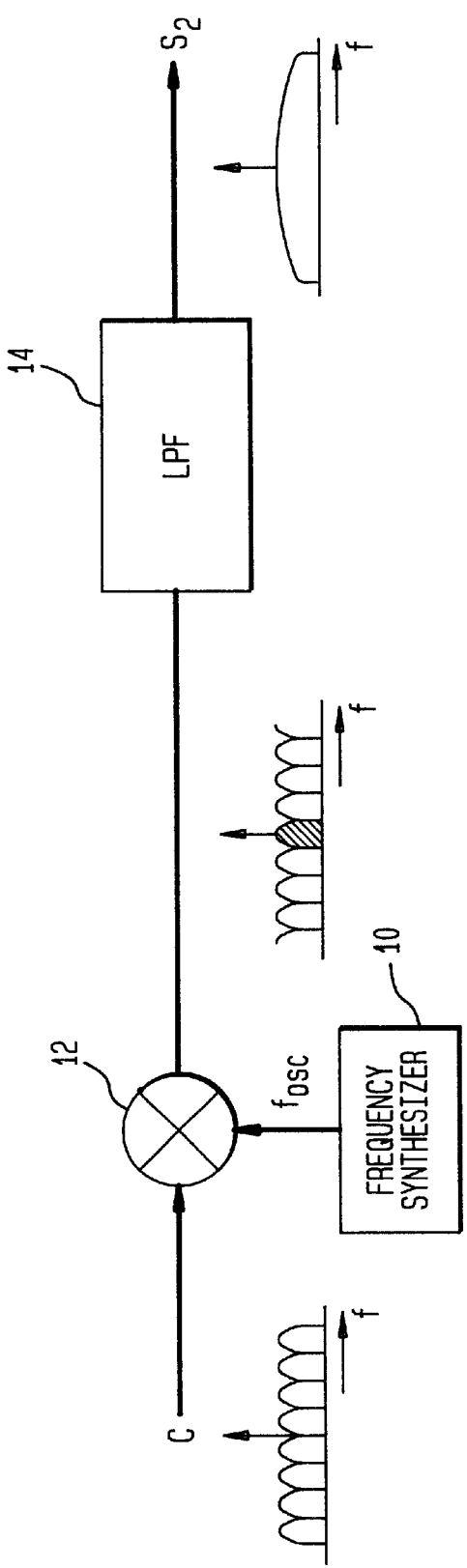
FIG. 3 is a block diagram of a typical channel selection algorithm.

The algorithm of FIG. 3 requires a frequency synthesizer 10, to generate the selected channel frequency. The output of the frequency synthesizer 10 and the composite signal are coupled to a pre-filter multiplier 12. The pre-filter multiplier 12 operates at the high sampling rate, and its operands have high solution. The output of the pre-filter multiplier 12 is coupled to a Low Pass Filter (LPF) 14 which selects the desired channel and decimates the filtered sample stream.

New Channel Selection Method

With the present invention, the frequency spectrum, which extends from $$-\frac{f_s}{2}$$

to $$\frac{f_s}{2},$$

Figure 4A:
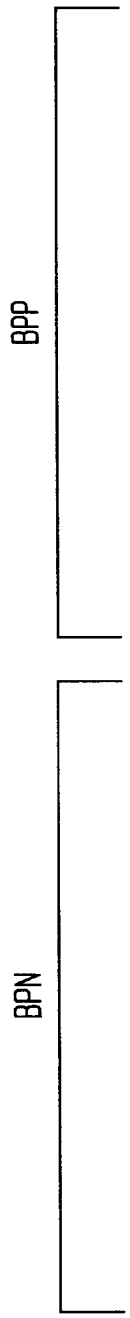
FIGS. 4a, 4b and 4c show the type of filter required for selection of each frequency band.
Figure 4B:
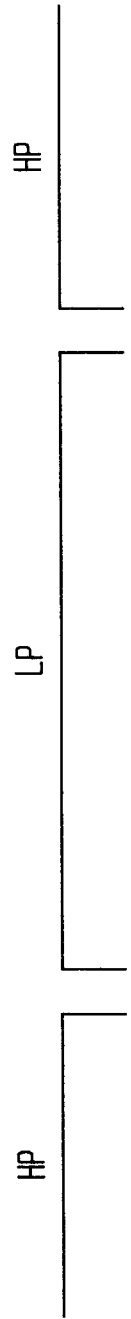

($f_s$ is the sampling frequency) is divided into four overlapping frequency bands (two sets of two frequency bands shown in FIGS. 4a and 4b). Each frequency band has a bandwidth of $$\frac{f_s}{2}.$$

Any particular channel of the composite digital signal lies in two frequency bands (one in each set shown in FIGS. 4a and 4b). In one band the particular channel will be near the center, while in the other band the particular channel will be near the edge. The particular channel is selected by utilizing the band in which it is closer to its center, see FIG. 4c. The advantage of utilizing the two frequency bands is to relax the sharpness requirement of the filters that are utilized.

The present invention channel selection method requires the use of lowpass and bandpass filters. A highpass filter is only required during the first channel selection stage. The bandpass filter is centered around $$\frac{f_s}{4} \text{ or } -\frac{f_s}{4}$$

and has a bandwidth of $$\frac{f_s}{2}.$$

The bandpass filter can be implemented as a frequency shift of $$-\frac{f_s}{4} \text{ or } \frac{f_s}{4}$$

followed by a lowpass filter.

Figure 4C:
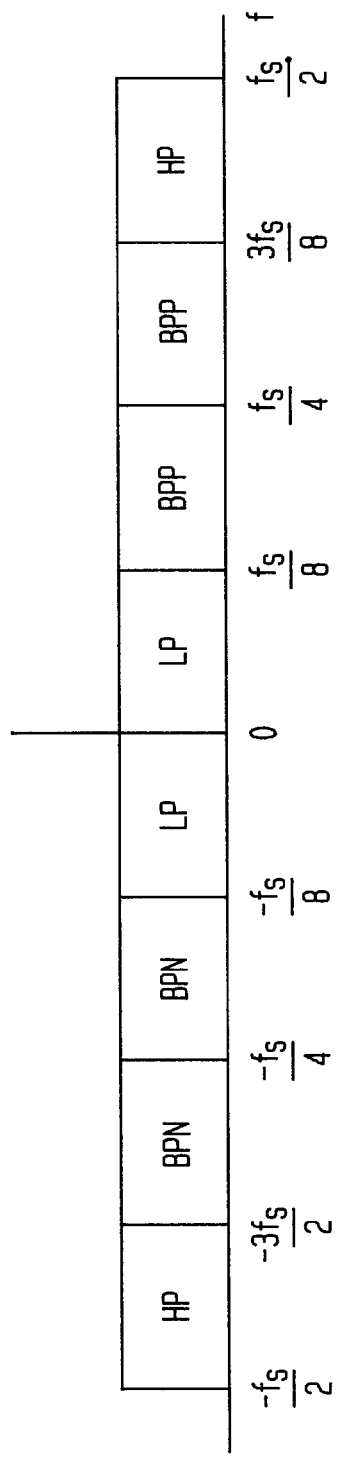

The type of filter used is determined by the frequency band in which the signal lies (Refer to FIG. 4c). BPN is the negative frequency bandpass filter which is centered around $$-\frac{f_s}{4}.$$

While, BPP is the positive frequency bandpass filter which is centered around $$\frac{f_s}{4}.$$

Figure 5A:
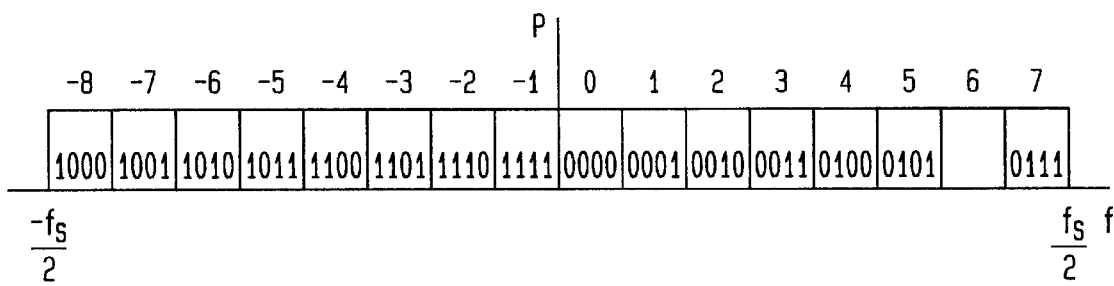
FIGS. 5a, 5b, 5c and 5d shows channel selection example using low pass, high pass, and band pass filters for selection of channel 6.

The new channel selection method can be better understood by following the details of a representative example, when the channel to be selected is channel 6, which has the binary representation of 0110 (see FIG. 5a). FIGS. 4a, 4b and 4c in conjunction with 5a, 5b, 5c and 5d, illustrate the channel selection process. Referring to FIG. 5a, channel 6 lies near the center of the highpass (HP) band (see FIG. 4b) and near the edge of the positive bandpass (BPP) band (see FIG. 4a). Therefore, a highpass (HP) filter is used which selects the channels −8, −7, −6, −5, 4, 5, 6, and 7. The output of the highpass (HP) filter is then processed by a so-called factor-two-down sampler, which produces a second frequency spectrum shown in FIG. 5b. Only three bits are now required to number the remaining channels. The most significant bit is thus removed.

Figure 5B:
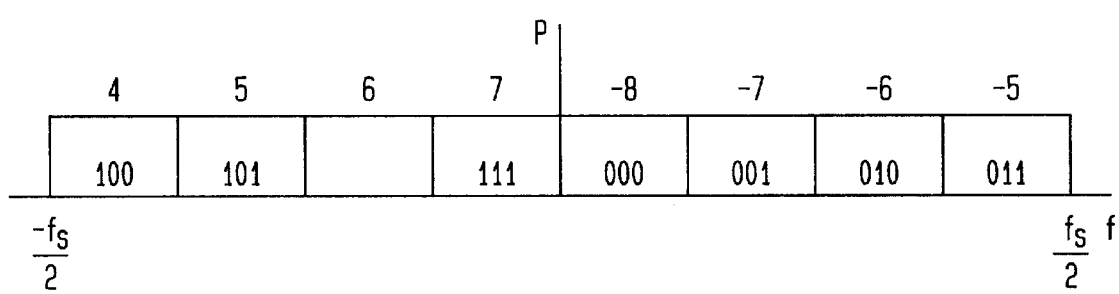

Referring to FIG. 5b, channel 6 now lies near the center of the negative frequency bandpass (BPN) band (see FIG. 4a) and near the edge of the low pass (LP) band. A negative frequency bandpass (BPN) filter is used, which selects the channels 4, 5, 6, and 7. The output of the negative frequency bandpass (BPN) filter is then processed by a factor-two-down sampler which produces a third frequency spectrum shown in FIG. 5c. The most significant bit is removed and the second most significant bit is inverted in this case.

Figure 5C:
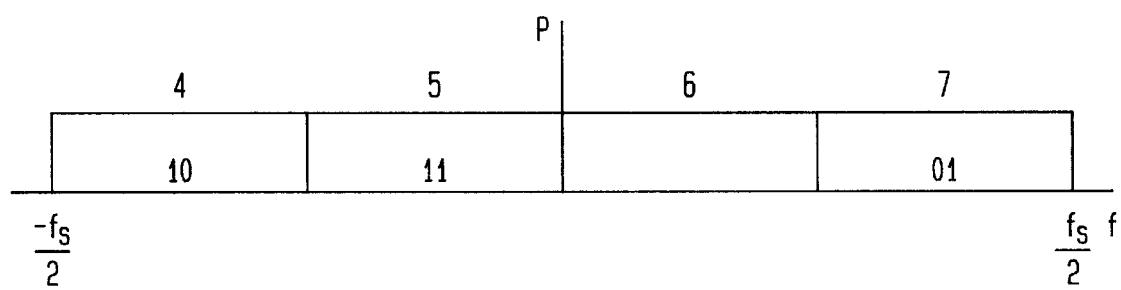
Figure 5D:
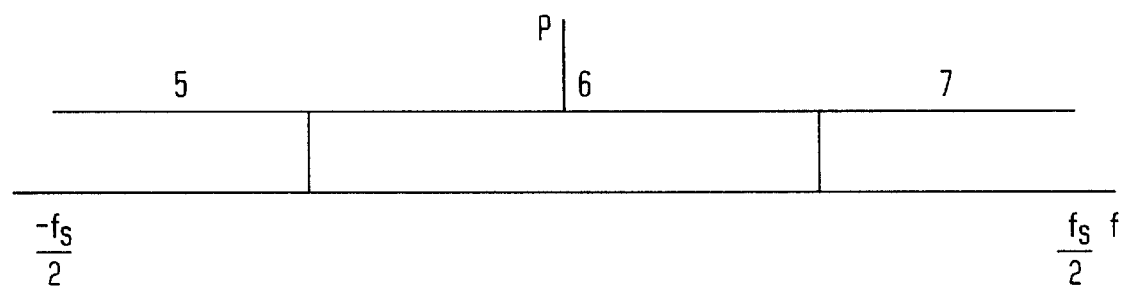

Referring to FIG. 5c, channel 6 now lies in the lowpass (LP) band (see FIG. 4b). If channel 6 were selected with channel 5 using a lowpass filter, this would need a sharp lowpass filter that would require many taps. Instead, referring to FIG. 5d it can be seen that if the spectrum is first shifted by $$-\frac{f_s}{8},$$

then a simple lowpass filter can be used in selecting channel 6.

The channel selection process, previously described for the particular selection of channel 6, can be formulated in a generalized method for the selection of any particular channel from the composite digital signal. In the generalized method, a represents an intermediate variable used by the channel selection algorithm and b refers to the binary representation of the channel number to be selected, such that $b_0$ represents the least significant bit of the channel number to be selected. The symbol $\oplus$ represents an exclusive or logical operation.

In the first stage if $(b_{m-1} \oplus b_{m-2})(\overline{b_{m-2} \oplus b_{m-3}})=1$ then a highpass filter is selected and $a_{m-2}=b_{m-2}=b_{m-3}$ else if $(\overline{b_{m-1} \oplus b_{m-2}})(\overline{b_{m-2} \oplus b_{m-3}})=1$ then a lowpass filter is selected and $a_{m-2}=b_{m-2}=b_{m-3}$ else if $b_{m-1}(b_{m-2} \oplus b_{m-3})=1$ then a negative frequency bandpass filter is selected and $a_{m-2}=b_{m-2}=b_{m-3}$ else if $\overline{b}_{m-1}(b_{m-2} \oplus b_{m-3})=1$ then a positive frequency bandpass filter is selected and $a_{m-2}=\overline{b}_{m-2}=b_{m-3}$.

In the next m−3 stages, the condition $(a_{m-i} \oplus b_{m-i-1})(\overline{b_{m-i-1} \oplus b_{m-i-2}})=1$ can not occur. Furthermore, in the next m−3 stages if $(\overline{a_{m-i} \oplus b_{m-i-1}})(\overline{b_{m-i-1} \oplus b_{m-i-2}})=1$ then a lowpass filter is selected and $a_{m-i-1}=b_{m-i-2}$ else if $a_{m-i}(b_{m-i-1} \oplus b_{m-i-2})=1$ $(b_{m-i-1}\overline{b}_{m-i-2}=1)$ then a negative frequency bandpass filter is selected and $a_{m-i-1}=\overline{b}_{m-i-1}=b_{m-i-2}$ else if $\overline{a}_{m-i}(b_{m-i-1} \oplus b_{m-i-2}=1)$ $(\overline{b}_{m-i-1}b_{m-i-2}=1)$ then a positive frequency bandpass filter is selected and $a_{m-i-1}=\overline{b}_{m-i-1}=b_{m-i-2}$ where i=2 ... m−2.

For the m−1 stage if stage m−1 is the first stage, this occurs when m=2, i.e. selecting one out of four channels $a_1=b_1$ if $a_1\overline{b}_0=1$ then shift the spectrum by $$\frac{3f_s}{8}.$$

This condition can only occur when selecting one out of four channels else if $a_1 b_0=1$ then shift the spectrum by $$\frac{f_s}{8}$$

else if $\overline{a}_1\overline{b}_0=1$ then shift the spectrum by $$-\frac{f_s}{8}$$

else if $\overline{a}_1 b_0=1$ then shift the spectrum by $$-\frac{3f_s}{8}.$$

This condition can only occur when selecting one out of four channels.

For the m−1 stage a low pass filter is selected after shifting the spectrum.

For the m stage always select a lowpass filter.

Channel Selection Method Implementation

The channel selection method described above utilizes four types of filters, a lowpass (LP) filter, a highpass (HP) filter, a negative frequency bandpass (BPN) filter, and a positive frequency baridpass (BPP) filter. Each one of these filters has a bandwidth of $$-\frac{f_s}{2}.$$

The filters can be implemented with a lowpass filter preceded by a multiplier that does the appropriate frequency shifting.

Figure 6A:
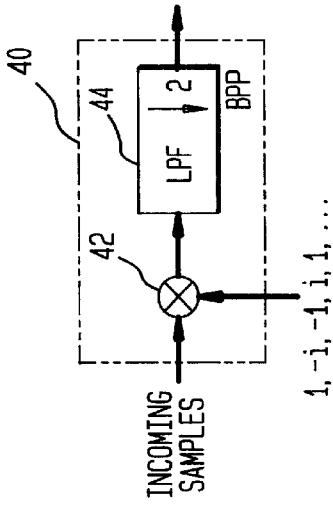
FIG. 6a shows a highpass filter.

Referring to FIG. 6a there is shown an exemplary embodiment of a highpass filter 20. In the high pass filter 20, multiplier 22 multiplies incoming samples by a sequence of 1, −1, 1, −1, 1 ... which produces a frequency shift of $$\frac{f_s}{2}.$$

The output of the multiplier 22 then passes through a low pass filter 24.

Figure 6B:
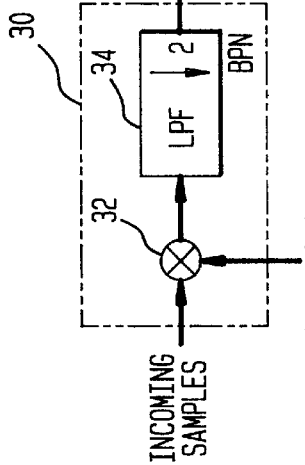
FIG. 6b shows a negative frequency bandpass filter.

Referring to FIG. 6b there is shown an exemplary embodiment of a negative frequency bandpass (BPN) filter 30. In the negative frequency bandpass BPN filter 30, multiplier 32, multiplies the incoming samples by a sequence of 1, i, −1, −i, 1, i ... which produces a frequency shift of $$\frac{f_s}{4}.$$

The output of the multiplier 32 then passes through a low pass filter 34.

Figure 6C:
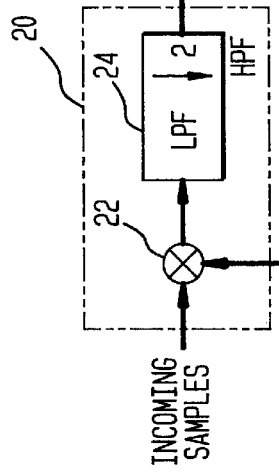
FIG. 6c shows a positive frequency bandpass filter.

Referring to FIG. 6c there is shown an exemplary embodiment of a positive frequency bandpass (BPP) filter 40. In the positive bandpass (BPP) filter 40, multiplier 42 multiplies the incoming samples by a sequence of 1, −i, −1, i, 1, −i ... which produces a frequency shift of $$-\frac{f_s}{4}.$$

The output of the multiplier 42 then passes through a low pass filter 44.

For the exemplary embodiments, the multiplication coefficients are 1, −1, i, and −i, which does not require the use of a fill multiplier. Instead, the exemplary embodiments utilize multiplexers and simple logic gates, which achieves a dramatic saving in the power dissipation in contrast to a full multiplier.

Figure 7:
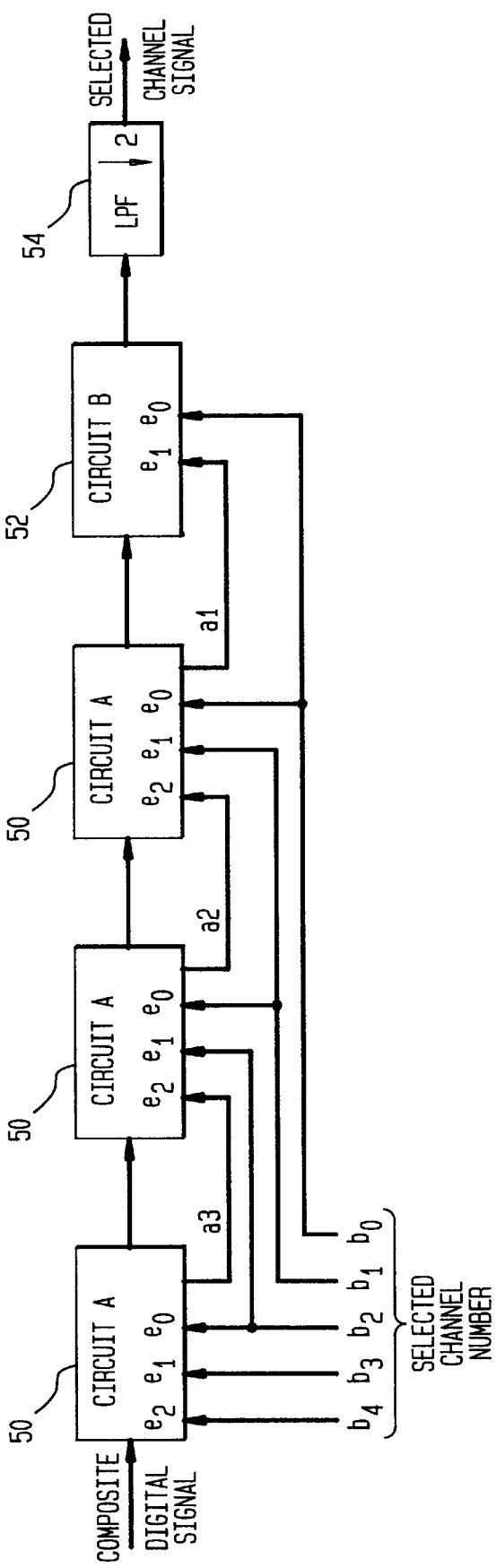
FIG. 7 shows a block diagram for digital channel selection of one channel out of thirty two channels.

An embodiment of the present invention of the digital channel selection method for the selection of one channel out of 32 channels is shown in FIG. 7. There are five stages in the embodiment. The first three stages can be implemented with circuit A 50, where the inputs to the first, second and third stage differ appropriately. Circuit A can be implemented as a $$\{0, \pm 1, 2\}\frac{f_s}{4}$$

frequency shifter followed by a lowpass filter. The fourth stage can be implemented with circuit B 52. Circuit B can be implemented as a $$\pm\{1, 3\}\frac{f_s}{8}$$

frequency shifter followed by a lowpass filter. The fifth stage can be implemented with a lowpass filter 54. A composite digital signal enters the first stage and a selected channel signal exits the fifth stage. A value corresponding to the selected channel number is provided to the first four stages. The second through fourth stage utilize an intermediate value provided by the prior stage.

Figure 8:
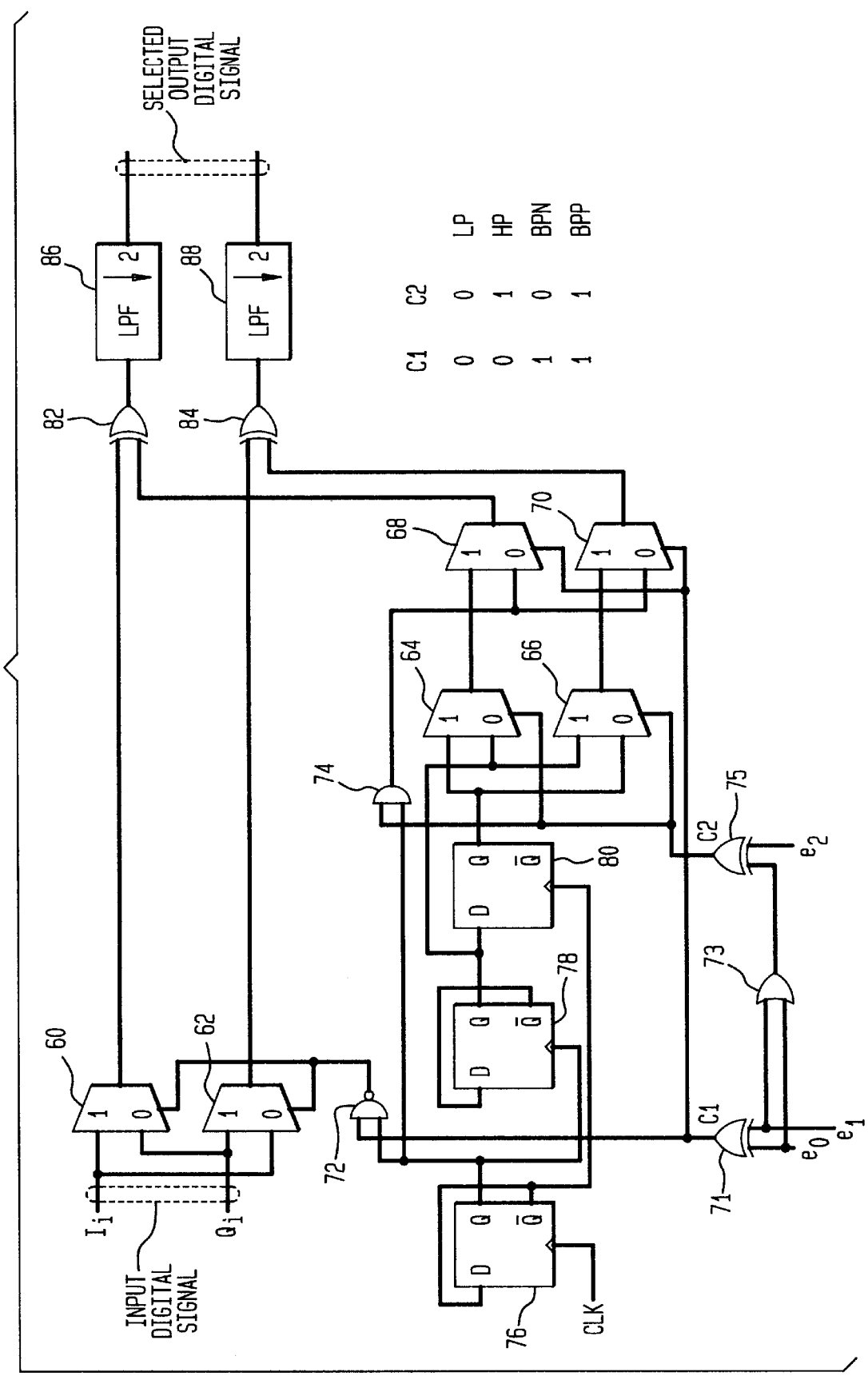
FIG. 8 shows a circuit diagram implementation of a $$\{0, \pm 1, 2\}\frac{f_s}{4}$$

A detailed schematic diagram of a representative embodiment of circuit A 50 is shown in FIG. 8. A composite digital signal is coupled to two multiplexers 60, 62 which are controlled by the output of a NAND gate 72. D flip-flop 76 is coupled to the NAND gate 72, AND gate 74 and two D flip-flops 78, 80. The output of the D flip-flop 78 and the output of the D flip-flop 80 are both coupled to two multiplexers 64, 66. The output of the AND gate 74 is coupled to two multiplexers 68, 70. The output of multiplexer 64 is coupled to multiplexer 68. The output of multiplexer 66 is coupled to multiplexer 70. The output of multiplexer 60 and the output of multiplexer 68 are coupled to an exclusive or gate 82. The output of multiplexer 62 and the output of multiplexer 70 are coupled to an Exclusive OR gate 84. The output of the exclusive or gate 82 is coupled to a low pass filter 86. The output of the exclusive or gate 84 is coupled to a low pass filter 88. An Exclusive OR gate 71 logically combines signals $e_0$ and $e_1$ to produce control input C1. Control input C1 is coupled to the nand gate 72 and controls the two multiplexers 68, 70. Signals $e_0$ and $e_1$ are logically combined by OR gate 73. The output of the OR gate 73 is logically combined with signal $e_2$ by an Exclusive OR gate 75 to produce control input C2. Control input C2 is coupled to the AND gate 74 and controls the two multiplexers 64, 66. The inverted output of the D flip-flop 76 is used to clock the two D flip-flops 78, 80. The D flip-flop 76 is controlled by an appropriate clock signal.

A detailed schematic diagram of a representative embodiment of circuit B 52 is shown in FIG. 9. Even samples of a composite digital signal are coupled to two multiplexers 102, 104. A sum and a difference of components of the composite digital signal are coupled to two multiplexers 106 and 108 which are controlled by the output of an Exclusive OR gate 110. An inverted output of a D flip-flop 112 is the input of the Exclusive OR gate 110, controls the two multiplexers 102 and 104 and clocks a D flip-flop 116. The output of the D flip-flop 112 clocks a D flip-flop 114. The output of the D flip-flop 114 is coupled to D flip-flop 116, an input of an Exclusive OR gate 118 and two multiplexers 120, 122. The output of the D flip-flop 116 is coupled to the two multiplexers 120, 122 and an input of An Exclusive NOR gate 124. The two multiplexers 102, 120 are coupled to inputs of an Exclusive OR gate 126. The multiplexer 106 and the output of the Exclusive OR gate 118 are coupled to inputs of an Exclusive OR gate 128. The two multiplexer 104, 122 are coupled the inputs of an Exclusive OR gate 130. The multiplexer 108 and the output of the Exclusive NOR gate 124 are coupled to inputs of an Exclusive OR gate 132. The output of the Exclusive OR gate 126 is coupled to a low pass filter 134. The output of the Exclusive OR gate 128 is coupled to a low pass filter 136. The output of the Exclusive OR gate 130 is coupled to a low pass filter 138. The output of the Exclusive OR gate 132 is coupled to a low pass filter 140. The outputs of the low pass filters 134, 136 are coupled to a summer 142. The outputs of the low pass filters 138, 140 are coupled to a summer 144. Signal $e_1$ is used as a control input C1, which is coupled to the Exclusive NOR gate 124 and an Exclusive OR gate 117. Signal e0 is used as a control input C2, which is coupled to the Exclusive OR gate 110, the Exclusive OR gate 117 and controls the two multiplexers 120, 122. The output of Exclusive OR gate 117 is coupled to the Exclusive OR gate 118. The D flip-flop 112 is controlled by an appropriate clock signal.

In stage m−1 a frequency shift of $$\pm\{1, 3\}\frac{f_s}{8}$$

is required. To eliminate the need for a multiplier for this frequency shift, the present invention utilizes the fact that a filter following a frequency shift is a decimation filter, that decimates the signal by a factor of 2. This filter is implemented as a polyphase filter that separates the input sample stream into even and odd sample streams. The multiplier is replaced by adders, multiplexers and other logic gates. The multiplier coefficients are hidden in the filter coefficients. A representative embodiment of the frequency shifter followed by the filter is shown in FIG. 9.

Assume a multiplier is used to provide the desired frequency shift, the multiplier coefficients are;

$$e^{\pm j\{1,3\}\frac{f_s}{8}n}$$

Where, n is the discrete time. These coefficients are periodic with a period N=8. Referring to FIG. 10, there is shown eight consecutive samples of the multiplier output for the four different frequency shifts. The input sample is $I_i+iQ_i$. It can be seen that the even samples require only multiplication by ±i, in addition to $I_i-Q_i$ interchange, which is equivalent to multiplying by ±j. The odd samples always require multiplication by $1/\sqrt{2}$, in addition to subtraction or addition operations. The multiplication operation is hidden in the coefficients of the odd sample branch of the polyphase filter. Hence, no extra multiplications are required to implement the frequency shift.

The present invention eliminates the need for a pre-filter multiplier. Channel selection is achieved through a method that determines the type of filter (LP, HP, BPN, or BPP) based on the channel to be selected. As the number of channels form which one channel is selected increases, the efficiency of the present invention in saving power increases over the prior methods.

Numerous modifications and alternative embodiments of the invention will be apparent to those skilled in the art in view of the foregoing description. Alternative embodiments include equivalent logic gate functions as well as other equivalent circuits. Dedicated logic gate functions may alternatively be implemented with a programmable logic unit, digital processor as well as other digital circuits wherein the functionality is implemented by suitably programming the device. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for selecting a digital channel from a composite digital signal comprised of a plurality of digital channels, the composite digital signal occupying a frequency spectrum, the method comprising the steps of:

in the frequency spectrum, designating a first plurality of frequency bands and a second plurality of frequency bands, wherein ones of the first plurality of frequency bands overlaps ones of the second plurality of frequency bands;

assigning two overlapping frequency bands to each of the plurality of digital channels, wherein the digital channel is approximately centered in one of said two frequency bands;

selecting a filter from a group of filters, said selected filter corresponding to said one of two frequency bands wherein the digital channel is approximately centered;

applying said selected filter to the composite digital signal.

2. The method as recited in claim 1 wherein said selected filter comprises applying a frequency shift to the composite digital signal producing a frequency shifted digital signal and applying a low pass filter to said frequency shifted digital signal.

3. The method as recited in claim 2 wherein said selected filter is a negative frequency bandpass filter.

4. The method as recited in claim 2 wherein said selected filter is a positive frequency bandpass filter.

5. The method as recited in claim 2 wherein said selected filter is a high pass filter.

6. The method as recited in claim 2 wherein said selected filter is a low pass filter.

7. A filter selection method for use in selecting a digital channel represented by a binary number $b_{m-1}b_{m-2} \ldots b_0$, wherein $b_0$ represents the least significant bit and $b_{m-1}$ represents the most significant bit, from a composite digital signal comprised of $2^m$ digital channels, the method utilizing an intermediate variable, a, the method comprising the steps of:

using a highpass filter and assigning $a_{m-2}=b_{m-2}=b_{m-3}$ when in a first stage $(b_{m-1} \oplus b_{m-2})(\overline{b_{m-2} \oplus b_{m-3}})=1$;

using a lowpass filter and assigning $a_{m-2}=b_{m-2}=b_{m-3}$ when in said first stage $(\overline{b_{m-1} \oplus b_{m-2}})(\overline{b_{m-2} \oplus b_{m-3}})=1$;

using a negative frequency bandpass filter and assigning $a_{m-2}=\overline{b}_{m-2}=b_{m-3}$ when in said first stage $b_{m-1}(b_{m-2} \oplus b_{m-3})=1$; and using a positive frequency bandpass filter and assigning $a_{m-2}=\overline{b}_{m-2}=b_{m-3}$ when in said first stage $\overline{b}_{m-1}(b_{m-2} \oplus b_{m-3})=1$.

8. The method as recited in claim 7 further comprising the steps of:

using said lowpass filter and assigning $a_{m-i-1}=b_{m-i-1}=b_{m-i-2}$ when in next m−3 stages $(\overline{a_{m-i} \oplus b_{m-i-1}})(\overline{b_{m-i-1} \oplus b_{m-i-2}})=1$;

using said negative frequency bandpass filter and assigning $a_{m-i-1}=\overline{b}_{m-i-1}=b_{m-i-2}$ when in said next m−3 stages $a_{m-i}(b_{m-i-1} \oplus b_{m-i-2})=1$; and using said positive frequency bandpass filter and assigning $a_{m-i-1}=\overline{b}_{m-i-1}=b_{m-i-2}$ when in said next m−3 stages $\overline{a}_{m-i}(b_{m-i-1} \oplus b_{m-i-2})=1$;

wherein i=2 . . . m−2.

9. The method as recited in claim 8 further comprising the steps of:

frequency shifting by $$\frac{3f_s}{8}$$

for an m−1 stage when $a_1\overline{b}_0=1$;

frequency shifting by $$\frac{f_s}{8}$$

for an m−1 stage when $a_1 b_0=1$;

frequency shifting by $$-\frac{f_s}{8}$$

for an m−1 stage when $\overline{a}_1 \overline{b}_0=1$;

frequency shifting by $$-\frac{3f_s}{8}$$

for an m−1 stage when $\overline{a}_1 b_0=1$;

using a low pass filter for an m−1 stage.

10. The method as recited in claim 9 further comprising the step of using a lowpass filter for an m stage.

11. A device for selecting a digital channel from a composite digital signal comprised of a plurality of digital channels, the composite digital signal occupying a frequency spectrum, comprising:

a logical circuit for selecting a filter from a group of filters; and a selection circuit for applying said selected filter to the composite digital signal;

wherein two frequency bands of a plurality of frequency bands are associated to each of the plurality of digital channels, said first frequency band and said second frequency band overlap such that the digital channel is approximately centered in one of said two frequency bands, said selected filter corresponding to aid one of sad two frequency bands wherein the digital channel is approximately centered.

12. The device as recited in claim 11 wherein said selected filter comprises a circuit for applying a frequency shift to the composite digital signal producing a frequency shifted digital signal and applying a low pass filter to said frequency shifted digital signal.

13. The device as recited in claim 12 wherein said selected filter is a negative frequency bandbass filter.

14. The device as recited in claim 12 wherein said selected filter is a positive frequency bandpass filter.

15. The device as recited in claim 12 wherein said selected filter is a high pass filter.

16. The device as recited in claim 12 wherein said selected filter is a low pass filter.

* * * * *